UNITED STATES PATENT OFFICE.

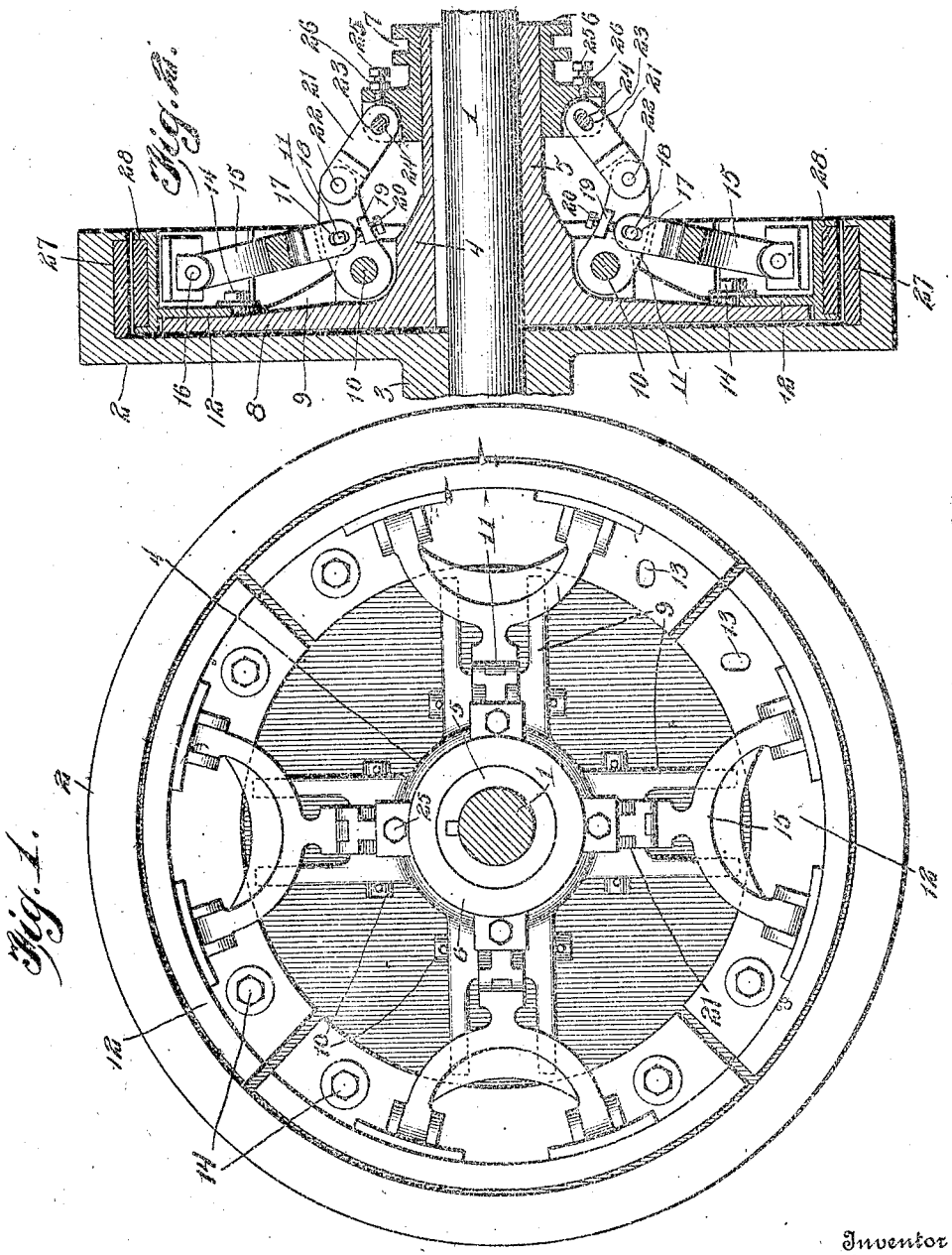

WILLIAM H. NELSON, OF ARDMORE, PENNSYLVANIA.

FRICTION-CLUTCH.

1,047,109.

Specification of Letters Patent. Patented Dec. 10, 1912.

Application filed January 27, 1912. Serial No. 673,802.

*To all whom it may concern:*

Be it known that I, WILLIAM H. NELSON, a citizen of the United States, residing at Ardmore, in the county of Montgomery and State of Pennsylvania, have invented new and useful Improvements in Friction-Clutches, of which the following is a specification.

This invention relates to friction clutches designed for use in connection with automobiles, shafting and also useful in many other places which will suggest themselves.

The main object of the present invention is to provide in connection with the mechanical elements of a friction clutch, means for readily, conveniently and practically taking up wear and compensating in the wearing away of the coöperating friction surfaces of the clutch.

With the above and other objects in view, the invention consists in the construction, combination and arrangement of parts, set forth in and falling within the scope of the appended claims.

In the drawing:—Figure 1 is a front elevation of a friction clutch embodying the present invention, illustrating the shaft in cross section. Fig. 2 is a diametrical view through the same, showing the clutch in elevation.

Referring to the drawing, 1 designates the shaft, 2 the female clutch member provided with a suitable hub 3, mounted on the shaft 1, and 4 the male member having an extended cylindrical hub 5 upon which there is slidingly mounted a sleeve 6 movable in the direction of length of the hub. This sleeve is provided with a groove 7 adapted to receive a fork of a suitable shifting lever or element. The member 4 of the clutch embodies a disk-shaped body 8 provided with radially extending, reinforcing webs 9 between which extend pivots 10 upon which are mounted the inner ends of a circular series of clutch operating levers 11.

Mounted to slide radially outward on the body 8 is a series of two or more segmental clutch elements 12, as best shown in Fig. 1, said elements being provided with slots 13 elongated in a direction to permit the outward and inward sliding movements of the clutch members, said slots receiving bolts 14 for retaining the clutch elements on the disk-shaped body 8 while permitting their free radial movement.

Interposed between each lever 11 and the corresponding clutch element 12 is a forked link 15, the outer extremities of which are pivotally connected to the clutch element at 16 while the inner end thereof is provided with a longitudinal slot 17 which fits over a pin 18 on the lever 11, as clearly shown in Fig. 2. The lever is also provided with a lug 19 through which is threaded a set screw 20, by the adjustment of which the throw of the link 15 may be regulated thus making it practical to take up wear between the wearing or bearing faces of the clutch.

Interposed between the sliding sleeve 6 and each lever 11 is a toggle link 21 which connects pivotally at one end at the point 22 with the outer extremity of the lever 11, while the outer end of said link is longitudinally slotted as shown at 23 to receive a pin 24 on the sleeve 6. Arranged behind the outer end of the link 21 is an adjusting set screw 25 which passes through a threaded lug 26 on the sleeve 6 for the purpose of regulating the throw of the link 21 and thereby compensating for any wear between the coöperating main surfaces of the clutch.

It is intended to provide the inner face of the clutch element 2 with inserts 27 of wood, fiber, or other material and in like manner the outer periphery of the male clutch member may be provided with inserts 28 of like material. In some cases, canvas may be applied to the wearing face of the male clutch element to coöperate with the wood or fiber inserts of the other member.

From the foregoing description, it will be understood that as wear takes place between the main working faces of the clutch, such wear may be readily compensated for by adjusting either the set screws 20 or the set screws 25, or both the series of set screws and in like manner each of the clutch elements 12 may be independently adjusted to the end that all of the clutch elements 12 may consistently coöperate with the inner periphery of the member 2 of the clutch, thereby giving the greatest efficiency to the clutch, as a whole.

I claim:—

1. A friction clutch embodying a shaft, a female member fast thereon, a male member provided with an extended cylindrical hub, a series of segmental clutch members mounted to slide radially on the male member, levers pivoted to the male member, a sleeve slidable on said hub, slotted links connecting the sleeve and lever, other slotted links connecting the clutch elements directly to said levers, and set screws on the sleeve and levers adapted to adjust the throw of the links connected thereto.

2. A friction clutch embodying a shaft, a female member fast thereon, a male member provided with an extended cylindrical hub, a series of segmental clutch elements mounted to slide radially on the male member, levers pivotally connected to the male member, a sleeve slidable on said hub, slotted links connecting the sleeve and levers, other slotted links connected to said levers and having their outer ends bifurcated and connected to the clutch elements, and set screws on the levers and sleeve adapted to adjust the throw of the links which connect with the clutch members.

In testimony whereof I affix my signature in presence of two witnesses.

WILLIAM H. NELSON.

Witnesses:
WILLIAM W. CHAMBERS,
JOHN W. CLAGHORN.